US009711971B2

United States Patent
Maekawa

(10) Patent No.: US 9,711,971 B2
(45) Date of Patent: Jul. 18, 2017

(54) WIRELESS POWER-SUPPLYING SYSTEM

(71) Applicant: IHI Corporation, Tokyo (JP)

(72) Inventor: Yuji Maekawa, Tokyo (JP)

(73) Assignee: IHI CORPORATION, Tokyo (JP)

( * ) Notice: Subject to any disclaimer, the term of this patent is extended or adjusted under 35 U.S.C. 154(b) by 295 days.

(21) Appl. No.: 14/670,703

(22) Filed: Mar. 27, 2015

(65) Prior Publication Data

US 2015/0200550 A1 Jul. 16, 2015

Related U.S. Application Data

(63) Continuation of application No. PCT/JP2013/073027, filed on Aug. 28, 2013.

(30) Foreign Application Priority Data

Oct. 1, 2012 (JP) .................................. 2012-219276

(51) Int. Cl.
*B60L 3/00* (2006.01)
*H02J 5/00* (2016.01)
*B60L 11/18* (2006.01)

(52) U.S. Cl.
CPC ............. *H02J 5/005* (2013.01); *B60L 11/182* (2013.01); *B60L 11/1824* (2013.01); *B60L 11/1829* (2013.01); *B60L 11/1833* (2013.01); *B60L 2230/10* (2013.01); *Y02T 10/7005* (2013.01); *Y02T 10/7088* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
None
See application file for complete search history.

(56) References Cited

U.S. PATENT DOCUMENTS

| 9,345,177 B2* | 5/2016 | Maekawa ............... H01F 38/14 |
| 2010/0065352 A1 | 3/2010 | Ichikawa |
| 2011/0148351 A1 | 6/2011 | Ichikawa |

(Continued)

FOREIGN PATENT DOCUMENTS

| CN | 201536894 U | 8/2010 |
| CN | 102342701 A | 2/2012 |

(Continued)

OTHER PUBLICATIONS

International Search Report, PCT/JP2013/073027, Date of Mailing: Oct. 1, 2013, 1 pg.

*Primary Examiner* — Long Nguyen

(74) *Attorney, Agent, or Firm* — Volpe and Koenig, P.C.

(57) ABSTRACT

A wireless power-supplying system includes a power-transmitting coil provided on the ground and a power-receiving coil provided above the power-transmitting coil and wirelessly supplies electric power from the power-transmitting coil to the power-receiving coil. The wireless power-supplying system further includes a flexible cover provided so as to cover the power-transmitting coil and configured to be inflated to occupy a space between the power-transmitting coil and the power-receiving coil. During the inflation of the flexible cover, the flexible cover assumes a specific shape capable of removing a foreign object laid thereon before occupying the space between the power-transmitting coil and the power-receiving coil.

4 Claims, 4 Drawing Sheets

(56) References Cited

U.S. PATENT DOCUMENTS

| | | | |
|---|---|---|---|
| 2012/0200151 A1 | 8/2012 | Obayashi et al. | |
| 2012/0295634 A1* | 11/2012 | Kim | H02J 7/025 |
| | | | 455/456.1 |
| 2013/0033227 A1 | 2/2013 | Gibbons, Jr. | |
| 2014/0340035 A1* | 11/2014 | Maekawa | B60L 11/182 |
| | | | 307/104 |

FOREIGN PATENT DOCUMENTS

| | | |
|---|---|---|
| DE | 102011108544 A1 | 2/2012 |
| DE | 1020111117685 A1 | 7/2012 |
| JP | 2010-070048 A | 4/2010 |
| JP | 2010-226946 A | 10/2010 |
| JP | 2012-196015 A | 10/2012 |
| WO | 2012/047779 A1 | 4/2012 |

\* cited by examiner

WIRELESS POWER-SUPPLYING SYSTEM

This application is a Continuation of International Application No. PCT/JP2013/073027, filed on Aug. 28, 2013, claiming priority based on Japanese Patent Application No. 2012-219276, filed Oct. 1, 2012, the content of which is incorporated herein by reference in their entirety.

TECHNICAL FIELD

The present invention relates to a wireless power-supplying system.

BACKGROUND ART

Patent Document 1 discloses a wireless power-supplying device which includes a primary coil (power-transmitting coil) for wirelessly supplying electric power to a secondary coil (power-receiving coil) of an electric vehicle and can supply electric power without reducing the power supply efficiency even when the stop position of the electric vehicle deviates. An opening is provided in a front lower portion of the wireless power-supplying device. The wireless power-supplying device includes a plate-shaped primary coil holder that has the primary coil provided therein and is driven so as to be movable back and forth in the horizontal direction through the opening. The primary coil holder is moved in the horizontal direction below the secondary coil of the electric vehicle such that the secondary coil and the primary coil face each other and electric power is wirelessly supplied. In the wireless power-supplying device, the upper edge of the opening comes into sliding contact with the upper surface of the primary coil holder. Even when a foreign object is laid on the primary coil holder (above the primary coil), it is possible to remove the foreign object.

PRIOR ART DOCUMENTS

Patent Documents

[Patent Document 1] Japanese Unexamined Patent Application, First Publication No. 2010-70048

DISCLOSURE OF THE INVENTION

Problems to be Solved by the Invention

In the related art, the primary coil holder having the primary coil provided therein is movable in the horizontal direction to remove a foreign object laid on the primary coil holder (above the primary coil). However, the primary coil is not necessarily provided in a place in which the primary coil can be horizontally moved. For example, in the related art, when the primary coil is buried in the ground, it is impossible to remove a foreign object laid above the primary coil since there is no space in which the primary coil can be horizontally moved.

The invention is made in view of the above-mentioned circumstances and an object of the invention is to provide a technique for removing a foreign object laid above a power-transmitting coil even when a primary coil (power-transmitting coil) is not movable.

Means for Solving the Problems

According to a first aspect of the invention, a wireless power-supplying system is provided which includes a power-transmitting coil provided on the ground and a power-receiving coil provided above the power-transmitting coil and wirelessly supplies electric power from the power-transmitting coil to the power-receiving coil. The wireless power-supplying system further includes a flexible cover provided so as to cover the power-transmitting coil and configured to be inflated to occupy a space between the power-transmitting coil and the power-receiving coil. During the inflation of the flexible cover, the flexible cover assumes a specific shape capable of removing a foreign object laid on the flexible cover before occupying the space between the power-transmitting coil and the power-receiving coil.

According to a second aspect of the invention, in the wireless power-supplying system according to the first aspect, an internal space of the flexible cover may be divided into a plurality of regions. The wireless power-supplying system may further include a gas-supplying member. When the electric power is supplied, the gas-supplying member may sequentially supply gas to the regions starting from a part of the regions and switching at a time interval to a region adjacent to the part of the regions in a radial direction with respect to a direction perpendicular to an upper surface of the power-transmitting coil.

According to a third aspect of the invention, in the wireless power-supplying system according to the second aspect, the flexible cover may be divided into a plurality of regions concentrically with respect to the direction perpendicular to the upper surface of the power-transmitting coil. The gas-supplying member may sequentially supply the gas to the regions, starting from a central circular region of the flexible cover and switching to region adjacent to the central circular region at a time interval.

According to a fourth aspect of the invention, in the wireless power-supplying system according to the second aspect, the flexible cover may be divided into a conical region which covers the power-transmitting coil and a region around the conical region. The gas-supplying member may first supply the gas to the conical region and supplies the gas to the region around the conical region after the conical region is inflated.

Effects of the Invention

According to the invention, during the inflation of the flexible cover, the flexible cover assumes a specific shape which can remove a foreign object laid thereon. Therefore, even when the power-transmitting coil is not movable, it is possible to remove a foreign object laid above the power-transmitting coil. According to the invention, the flexible cover is inflated to occupy the space between the power-transmitting coil and the power-receiving coil. Therefore, it is possible to prevent a foreign object from entering the space between the power-transmitting coil and the power-receiving coil.

EMBODIMENTS FOR CARRYING OUT THE INVENTION

Hereinafter, embodiments of the invention will be described with reference to the drawings.

First Embodiment

Figure 1:
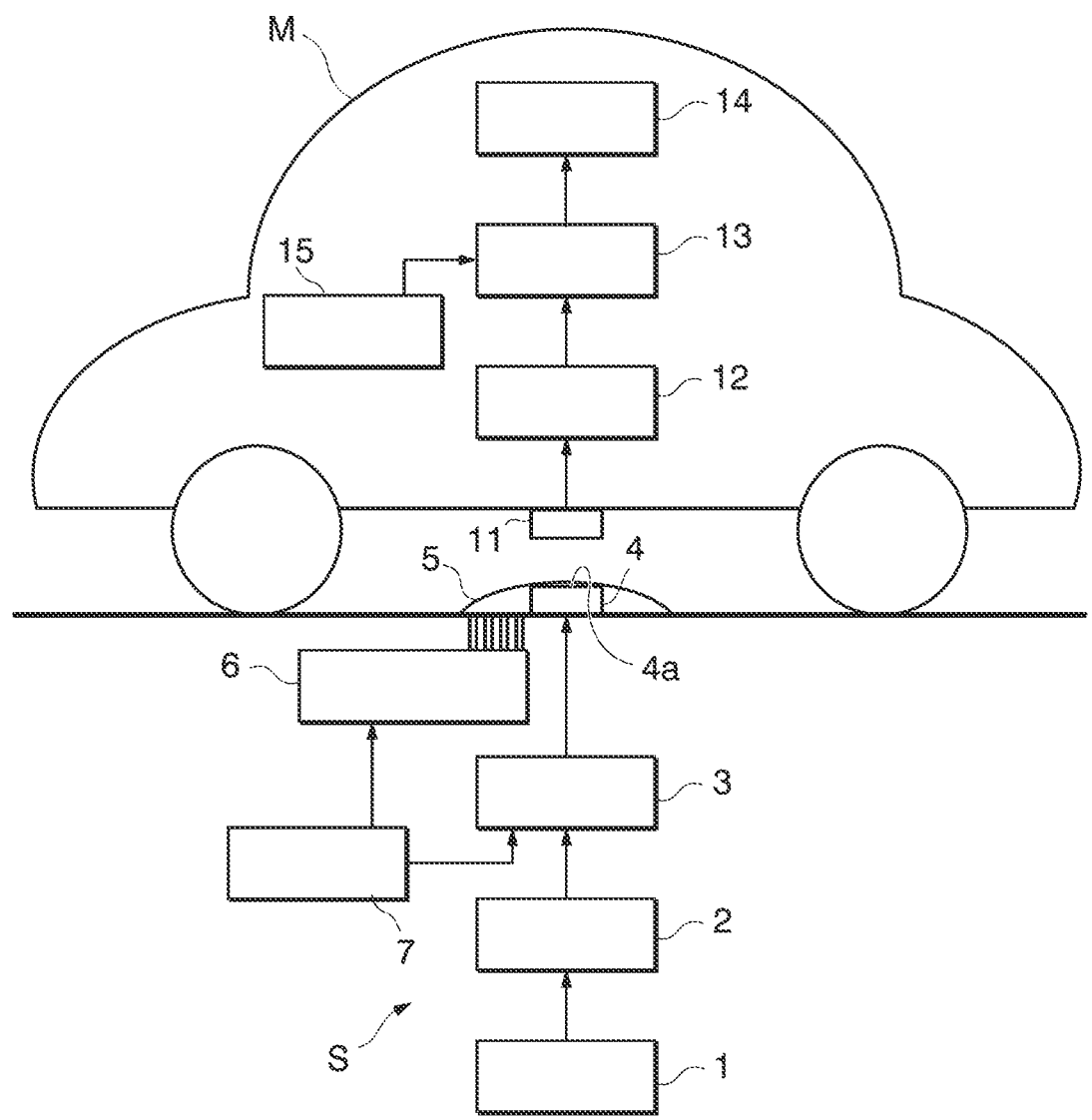
FIG. 1 is a block diagram illustrating the functional structure of a wireless power-supplying system according to a first embodiment of the invention.

A first embodiment will be described. As illustrated in FIG. 1, a wireless power-supplying system according to the first embodiment includes a ground power-supplying device S that is buried in the ground and a vehicle M that receives electric power from the ground power-supplying device S. In the wireless power-supplying system, the ground power-supplying device S wirelessly supplies electric power to the vehicle M on the basis of a magnetic resonance method which is one of the wireless power-supplying methods.

The ground power-supplying device S is buried, for example, at a stop position in an intersection or in a grade crossing or at a parking position in a parking lot and wirelessly supplies electric power to the vehicle M which is parked or stopped at the parking position or at the stop position. As illustrated in FIG. 1, the ground power-supplying device S includes an electric power source 1, a rectifier circuit 2, a power-supplying circuit 3, a power-transmitting coil 4, a flexible cover 5, a power-supplying gas supply and exhaust mechanism 6, and a power-supplying control unit 7. The power-supplying gas supply and exhaust mechanism 6 and the power-supplying control unit 7 constitute a gas-supplying member according to this embodiment.

The electric power source 1 is an AC power source which has output terminals connected to input terminals of the rectifier circuit 2 and supplies, to the rectifier circuit 2, AC power that is required to supply electric power to the vehicle M. The electric power source 1 is a grid power source which supplies, for example, a three-phase AC power of 200 V or 400 V or a single-phase AC power of 100 V.

The rectifier circuit 2 has input terminals connected to the electric power source 1 and output terminals connected to the power-supplying circuit 3. The rectifier circuit 2 rectifies the AC power supplied from the electric power source 1 into DC power and outputs the DC power to the power-supplying circuit 3.

The power-supplying circuit 3 has input terminals connected to the rectifier circuit 2 and output terminals, each terminal being connected to each end of the power-transmitting coil 4. The power-supplying circuit 3 is a kind of inverter that includes a resonance capacitor forming a power-supplying-side resonance circuit together with the power-transmitting coil 4. The power-supplying circuit 3 converts the DC power supplied from the rectifier circuit 2 into AC power (high-frequency power), which has a frequency higher than the AC power of the electric power source 1, and supplies the AC power to the power-transmitting coil 4, the conversion and the supply being on the basis of a control command input from the power-supplying control unit 7.

The power-transmitting coil 4 is a helical coil having a predetermined coil diameter and is provided at the parking position or at the stop position, with a coil axis aligned in the up-and-down direction (vertical direction), such that it is exposed on the surface of the ground or it is molded with a non-magnetic material such as plastic. Each end of the power-transmitting coil 4 is connected to each output terminal of the power-supplying circuit 3. The power-transmitting coil 4 is supplied with the high-frequency power from the power-supplying circuit 3, generates a magnetic field, and wirelessly supplies electric power to the vehicle M.

Figure 2A:
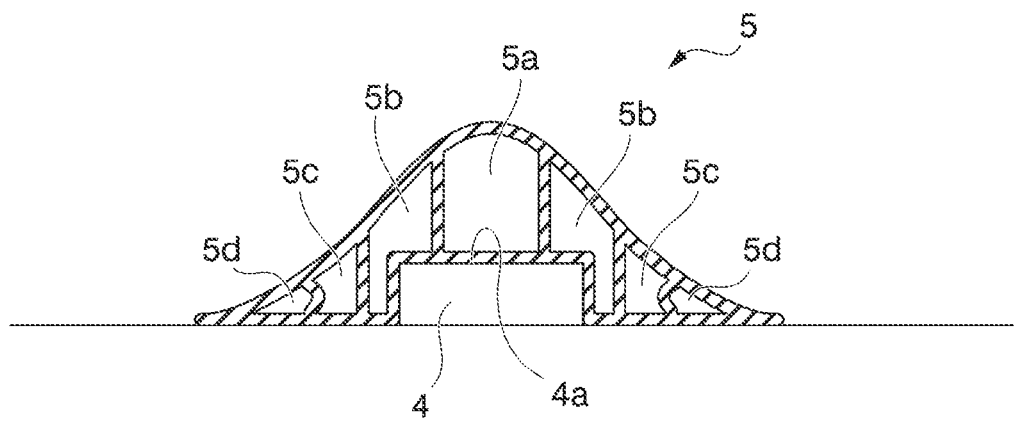
FIG. 2A is a schematic diagram illustrating the divided regions of the internal space of a flexible cover in the first embodiment of the invention.
Figure 2B:
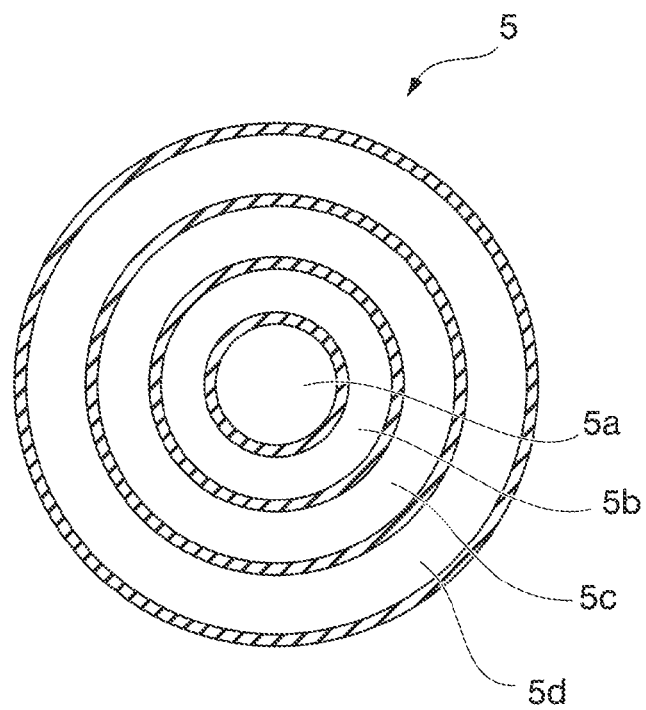
FIG. 2B is a schematic diagram illustrating the divided regions of the internal space of the flexible cover in the first embodiment of the invention.

The flexible cover 5 is a film made of an elastic material, such as rubber, and is a kind of balloon. The flexible cover 5 is provided on the surface of the ground and contains the power-transmitting coil 4. In addition, the flexible cover 5 is hermetically sealed and is inflated around the power-transmitting coil 4 when gas (for example, air) is supplied from the power-supplying gas supply and exhaust mechanism 6 (see FIG. 3C). The internal space of the flexible cover 5 is divided into a plurality of regions. That is, the internal space of the flexible cover 5 is concentrically divided into four regions 5a to 5d when viewed perpendicularly to the upper surface 4a of the power-transmitting coil 4, as illustrated in FIGS. 2A and 2B. (The internal space of the flexible cover 5 is divided into four regions 5a to 5d concentrically with respect to a direction perpendicular to the upper surface 4a of the power-transmitting coil 4.) FIG. 2A is a side cross-sectional view illustrating the progress of the inflation of the flexible cover 5 (which is the same as FIG. 3B) and FIG. 2B is a top cross-sectional view. In this embodiment, the internal space of the flexible cover 5 is divided into the four regions 5a to 5d. However, the number of divided regions is not limited to four. The flexible cover 5 may be divided into two or more regions.

The power-supplying gas supply and exhaust mechanism 6 is a kind of pump that supplies gas into the flexible cover 5 and exhausts gas from the flexible cover 5 on the basis of a control command input from the power-supplying control unit 7. The power-supplying gas supply and exhaust mechanism 6 includes four supply and exhaust pipes. The four supply and exhaust pipes are connected to the regions 5a to 5d of the flexible cover 5, respectively.

The power-supplying control unit 7 is a software-based control device that includes, for example, a microprocessor and a memory. The power-supplying control unit 7 operates on the basis of a predetermined power-supplying control program. The power-supplying control unit 7 controls the power-supplying circuit 3 and the power-supplying gas supply and exhaust mechanism 6. The details of processing in the power-supplying control unit 7 will be described in the following description of an operation.

The vehicle M is an automobile which is driven by the driver and travels on the road. For example, the vehicle M is an electric vehicle or a hybrid vehicle which travels using electric power as a power source. As illustrated in FIG. 1, the vehicle M includes a power-receiving coil 11, a power-receiving circuit 12, a charging circuit 13, a battery 14 and a power-receiving control unit IS. Of course, the vehicle M includes components required for driving, such as a drive motor, a steering wheel, and a brake, which are not illustrated in FIG. 1.

The power-receiving coil 11 is a helical coil that has substantially the same coil diameter as the power-transmitting coil 4 of the ground power-supplying device S and is provided on the bottom of the vehicle M so as to face the power-transmitting coil 4, with a coil axis aligned in the up-and-down direction (vertical direction). Each end of the power-receiving coil 11 is connected to each input terminal of the power-receiving circuit 12. When the magnetic field from the power-transmitting coil 4 is applied, electromotive force is induced by electromagnetic induction in the power-receiving coil 11 and the power-receiving coil 11 outputs the electromotive force to the power-receiving circuit 12.

The power-receiving circuit 12 has the input terminals, each terminal being connected to each end of the power-receiving coil 11 and output terminals connected to input terminals of the charging circuit 13. The power-receiving circuit 12 is a kind of rectifier circuit that includes a resonance capacitor forming a power-receiving-side resonance circuit together with the power-receiving coil 11, converts the AC power supplied from the power-receiving coil 11 into DC power, and supplies the DC power to the charging circuit 13. The capacitance of the resonance capacitor of the power-receiving circuit 12 is set such that the resonance frequency of the power-supplying-side resonance circuit is equal to the resonance frequency of the power-receiving-side resonance circuit.

The charging circuit 13 has input terminals connected to output terminals of the power-receiving circuit 12 and output terminals connected to input terminals of the battery 14 and charges the battery 14 with the electric power (DC power) supplied from the power-receiving circuit 12. The battery 14 is a rechargeable battery (for example, a secondary battery, such as a lithium-ion battery or a nickel-metal hydride battery) mounted in the vehicle M and supplies driving power to, for example, a drive motor (not illustrated). The power-receiving control unit 15 is a software-based control device that includes, for example, a microprocessor and a memory and operates based on a predetermined power-receiving control program, and controls the charging circuit 13.

The operation of the wireless power-supplying system having the above-mentioned structure according to the first embodiment will be described.

First, the operation of the vehicle M and the ground power-supplying device S at a time when electric power is not supplied will be described. When electric power is not supplied (for example, the user drives the vehicle M), the power-receiving control unit 15 of the vehicle M stops the charging circuit 13. When electric power is not supplied, that is, when the vehicle M to be supplied with electric power is not stopped at the parking position or at the stop position, the power-supplying control unit 7 of the ground power-supplying device S stops the power-supplying circuit 3 and instructs the power-supplying gas supply and exhaust mechanism 6 to exhaust gas in the flexible cover 5 such that the flexible cover 5 is completely deflated.

Then, the user drives the vehicle M to the position where the ground power-supplying device S is installed and stops the vehicle M at the position. The power-receiving control unit 15 of the vehicle M detects the installation position of the ground power-supplying device S from an output of a position sensor (not illustrated), such as an acoustic wave sensor or an optical sensor. When detecting, as described above, that the vehicle is moved to the upper side of the ground power-supplying device S from the output of the position sensor, such as an acoustic wave sensor or an optical sensor, the power-receiving control unit 15 instructs the charging circuit 13 to start a charging operation.

The power-supplying control unit 7 of the ground power-supplying device S detects, in a similar way as the vehicle M detects the position of the ground power-supply device S, the position of the vehicle M from an output of a position sensor (not illustrated), such as an acoustic wave sensor or an optical sensor. When detecting that the vehicle M is moved to the upper side of the ground power-supplying device S from the output of the position sensor, such as an acoustic wave sensor or an optical sensor, the power-supplying control unit 7 instructs the power-supplying gas supply and exhaust mechanism 6 to supply gas such that the flexible cover 5 is fully inflated.

The power-supplying control unit 7 instructs the power-supplying gas supply and exhaust mechanism 6 to sequentially supply gas first to the region 5a and then to the regions 5b, 5c, and 5d, which are adjacent to the region 5a in a radial direction when viewed perpendicularly to the upper surface 4a of the power-transmitting coil 4, in this order at a time interval. (The radial direction is radiated with respect to the direction perpendicular to the upper surface 4a of the power-transmitting coil 4.) That is, the power-supplying control unit 7 instructs the power-supplying gas supply and exhaust mechanism 6 to sequentially supply gas first to the central circular region 5a and then to the regions 5b, 5c, and 5d which are adjacent to the region 5a in the flexible cover 5 in this order at a time interval.

Figure 3A:
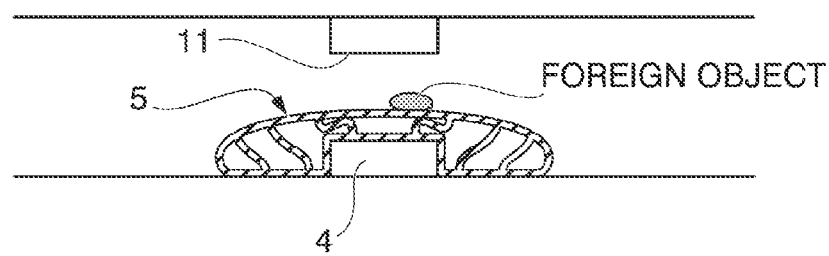
FIG. 3A is a schematic diagram illustrating the progress of the inflation of the flexible cover in the first embodiment of the invention.
Figure 3B:
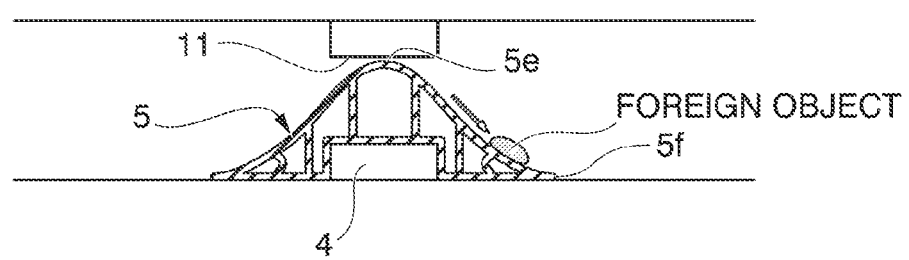
FIG. 3B is a schematic diagram illustrating the progress of the inflation of the flexible cover in the first embodiment of the invention.

Since gas is sequentially supplied to the flexible cover 5 in the order of the regions 5a, 5b, 5c, and 5d at a time interval, the flexible cover 5 assumes a specific shape which can remove a foreign object, such as dust, laid thereon during its inflation. That is, before gas is supplied, the flexible cover 5 is completely deflated and has a collapsed dome shape as illustrated in FIG. 3A. When the supply of gas starts, gas is sequentially supplied to the regions 5a, 5b, 5c, and 5d at a time interval and the regions 5a, 5b, 5c, and 5d are sequentially inflated in this order. The flexible cover 5 assumes a shape with a steep slope from an apex 5e to a rim 5f as illustrated in FIG. 3B. Therefore, a foreign object slides down the slope of the flexible cover 5 and are removed from the surface of the flexible cover 5, as illustrated in FIG. 3B.

Figure 3C:
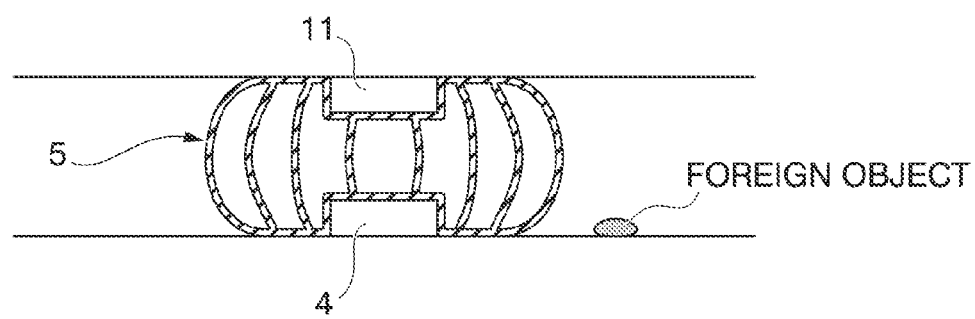
FIG. 3C is a schematic diagram illustrating the progress of the inflation of the flexible cover in the first embodiment of the invention.

Then, gas is sufficiently supplied to each of the regions 5a to 5d and the flexible cover 5 occupies a space between the power-transmitting coil 4 and the power-receiving coil 11. That is, as illustrated in FIG. 3C, the flexible cover 5 is inflated and covers the power-receiving coil 11 so as to come into contact with the lower and side surfaces of the power-receiving coil 11 which is exposed from the bottom of the vehicle M. Therefore, in this embodiment, it is possible to prevent a foreign object from entering the space between the power-transmitting coil 4 and the power-receiving coil 11.

The power-supplying control unit 7 instructs the power-supplying gas supply and exhaust mechanism 6 to supply a predetermined amount of gas. When the inflation of the cover is completed, the power-supplying control unit 7 instructs the power-supplying circuit 3 to start a power-supplying operation. The power-receiving control unit 15 of the vehicle M controls the charging circuit 13 such that the battery 14 is appropriately charged by monitoring the charged state of the battery 14. When it is detected that the battery 14 is fully charged, the power-receiving control unit 15 notifies that the battery 14 has been fully charged, using, for example, a display (not illustrated). Then, when recognizing that the battery 14 has been fully charged from, for example, the display (not illustrated), the user drives the vehicle M and moves from the installation position of the ground power-supplying device S.

When detecting that the vehicle M is moved from the output of the position sensor (not illustrated), such as an acoustic wave sensor or an optical sensor, the power-supplying control unit 7 of the ground power-supplying device S stops the control of the power-supplying circuit 3 and controls the power-supplying gas supply and exhaust mechanism 6 such that the flexible cover 5 is completely deflated.

According to the wireless power-supplying system of the first embodiment, the flexible cover 5 has a shape with a steep slope which can remove a foreign object laid thereon during the inflation of the flexible cover 5. Therefore, even when the power-transmitting coil 4 is not movable, it is possible to remove the foreign object laid above the power-transmitting coil 4. In addition, according to the wireless power-supplying system of the first embodiment, the flexible cover 5 is inflated and occupies the space between the power-transmitting coil 4 and the power-receiving coil 11. Therefore, it is possible to prevent a foreign object from entering the space between the power-transmitting coil 4 and the power-receiving coil 11.

Since the flexible cover 5 is made of a non-conductive and non-magnetic material, such as rubber, the magnetic field which is generated by the power-transmitting coil 4 and is applied to the power-receiving coil 11 is not affected by the flexible cover 5 and the wireless power supply efficiency is not reduced.

Second Embodiment

A wireless power-supplying system according to a second embodiment will be described.

The wireless power-supplying system according to the second embodiment includes a flexible cover 25 instead of the flexible cover 5 according to the first embodiment and also includes a power-supplying gas supply and exhaust mechanism 26 instead of the power-supplying gas supply and exhaust mechanism 6 according to the first embodiment. The other components are the same as those in the first embodiment. Therefore, in the second embodiment, the description of the same components as those in the first embodiment will not be repeated.

Figure 4A:
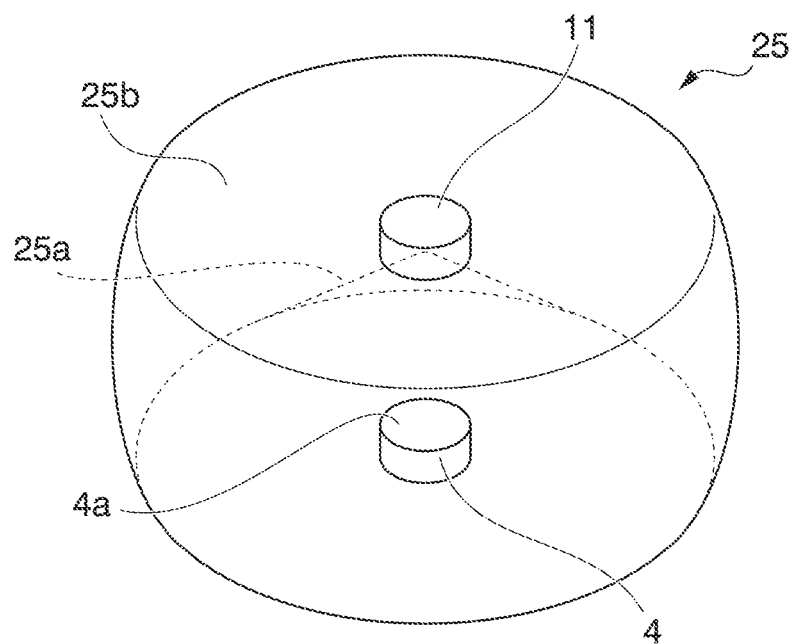
FIG. 4A is a schematic diagram illustrating the divided regions of the internal space of a flexible cover in a wireless power-supplying system according to a second embodiment of the invention.
Figure 4B:
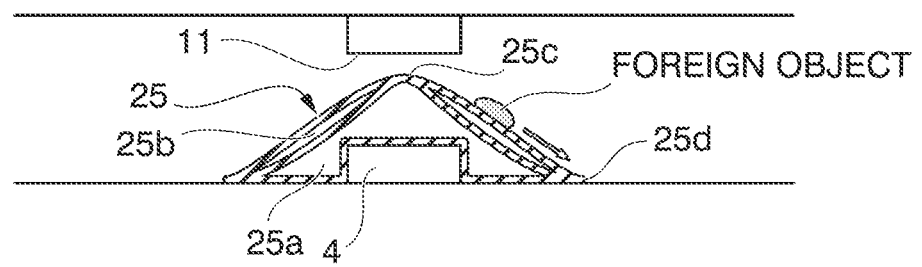
FIG. 4B is a schematic diagram illustrating the divided regions of the internal space of the flexible cover in the wireless power-supplying system according to the second embodiment of the invention.

As illustrated in FIGS. 4A and 4B, the internal space of the flexible cover 25 according to the second embodiment is divided into a conical region 25a which covers the power-transmitting coil 4 and a region 25b which is provided around the region 25a when the flexible cover 25 is inflated. In this embodiment, the region 25a has a cone shape so as to match the shape (circular shape) of the upper surface 4a of the power-transmitting coil 4. However, for example, when the upper surface 4a of the power-transmitting coil 4 has a rectangular shape, the region 25a may have a square pyramid shape so as to match the shape of the upper surface 4a of the power-transmitting coil 4. The power-supplying gas supply and exhaust mechanism 26 includes two supply and exhaust pipes. The two supply and exhaust pipes are connected to the regions 25a and 25b of the flexible cover 25, respectively.

The operation of the wireless power-supplying system having the above-mentioned structure according to the second embodiment will be described. The description of the same operation as that in the first embodiment will not be repeated.

When detecting that a vehicle M is moved to the upper side of a ground power-supplying device S from an output of a position sensor (not illustrated), such as an acoustic wave sensor or an optical sensor, a power-supplying control unit 7 of the ground power-supplying device S instructs the power-supplying gas supply and exhaust mechanism 26 to supply gas such that the flexible cover 25 is fully inflated.

The power-supplying control unit 7 instructs the power-supplying gas supply and exhaust mechanism 26 to sequentially supply gas first to the conical region 25a and then to the region 25b, which is adjacent to the conical region 25a in a radial direction when viewed perpendicularly to the upper surface 4a of the power-transmitting coil 4, in this order at a time interval. That is, the power-supplying control unit 7 instructs the power-supplying gas supply and exhaust mechanism 26 to sequentially supply gas to the conical region 25a and the region 25b in this order such that the gas is supplied to the region 25b after the conical region 25a is fully inflated.

Therefore, the flexible cover 25 has a specific shape which can remove a foreign object laid thereon during its inflation. That is, when the supply of gas starts, only the conical region 25a of the flexible cover 25 is inflated and the flexible cover 25 has a shape which has a steep slope from an apex 25c to a rim 25d. Therefore, a foreign object slides down the steep slope of the flexible cover 25 and are removed from the surface of the flexible cover 25.

After the conical region 25a is inflated, gas is supplied to the region 25b and the region 25b is inflated. In this way, the flexible cover 25 occupies a space between the power-transmitting coil 4 and the power-receiving coil 11. That is, as illustrated in FIG. 4A, the flexible cover 25 is inflated and covers the power-receiving coil 11 so as to come into contact with the lower and side surfaces of the power-receiving coil 11 which is exposed from the bottom of the vehicle M. Therefore, in this embodiment, it is possible to prevent a foreign object from entering the space between the power-transmitting coil 4 and the power-receiving coil 11.

According to the wireless power-supplying system according to the second embodiment, the flexible cover 25 has a shape with a steep slope which can remove a foreign object laid thereon during its inflation. Therefore, even when the power-transmitting coil 4 is not movable, it is possible to remove the foreign object laid above the power-transmitting coil 4. In addition, according to this embodiment, the flexible cover 25 is inflated and occupies the space between the power-transmitting coil 4 and the power-receiving coil 11. Therefore, it is possible to prevent a foreign object from entering the space between the power-transmitting coil 4 and the power-receiving coil 11.

Since the flexible cover 25 is made of a non-conductive and non-magnetic material, such as rubber, the magnetic field which is generated by the power-transmitting coil 4 and is applied to the power-receiving coil 11 is not affected by the flexible cover 25 and wireless power supply efficiency is not reduced.

The embodiments of the invention are described above, but the invention is not limited to the above-described embodiments. For example, the following modifications are considered.

(1) In the first and the second embodiments, the internal space of the flexible covers 5 and 25 is divided into a plurality of regions (the regions 5a to 5d or the regions 25a and 25b) and the power-supplying gas supply and exhaust mechanisms 6 and 26 supply gas to the regions at a time interval to remove a foreign object. However, the invention is not limited thereto.

For example, for a manner of division of the internal space of the flexible cover 5 into a plurality of regions (for the number of divisions or the shape of the divided regions), manners other than the manners according to the first and second embodiments may be used. In addition, even in a case in which the internal space of the flexible cover 5 is not divided, but is formed by one region, it is possible to remove a foreign object laid above the power-transmitting coil 4 by forming a flexible cover in a shape which slopes downward from the apex to the rim before the inflation of the flexible cover. In this case, the power-supplying gas supply and exhaust mechanism 6 supplies gas to the internal space of the flexible cover at a constant rate. In addition, the flexible cover need not have the shape which has one point as the apex, but may have a roof shape with a pair of slopes in order to remove a foreign object laid above the power-transmitting coil 4. The flexible cover need not have the shape with a pair of slopes, but may have a shape with one slope and a vertical surface in order to remove a foreign object laid above the power-transmitting coil 4.

(2) The above-described embodiments may use a jamming transition phenomenon. That is, powders are supplied mixed with the gas to the flexible covers 5 and 25 such that the flexible covers 5 and 25 are filled with the powders. Then, the flexible covers 5 and 25 are inflated so as to cover the power-receiving coil 1. Then, only the gas in the flexible covers 5 and 25 is exhausted and the powders in the flexible covers 5 and 25 are pseudo-solidified. In this state, the powders are solidified while covering the power-transmitting coil 4 and the power-receiving coil 11. Therefore, the flexible covers 5 and 25 can occupy the space between the power-transmitting coil 4 and the power-receiving coil 11.

(3) In the above-described embodiments, the magnetic resonance method is used as the wireless power-supplying method. However, an electromagnetic induction method may be used.

The power-transmitting coil 4 and the power-receiving coil 11 are not limited to the helical coils. The power-transmitting coil 4 and the power-receiving coil 11 may be other coils, such as solenoid coils or circular coils, and may have different shapes and sizes as long as electric power can be wirelessly supplied.

INDUSTRIAL APPLICABILITY

According to the wireless power-supplying system of the invention, it is possible to prevent a foreign object from entering a space between the power-transmitting coil and the power-receiving coil.

The invention claimed is:

1. A wireless power-supplying system comprising a power-transmitting coil provided on the ground and a power-receiving coil provided above the power-transmitting coil, for wirelessly supply electric power from the power-transmitting coil to the power-receiving coil, the wireless power-supplying system comprising:
   a flexible cover provided so as to cover the power-transmitting coil and configured to be inflated to occupy a space between the power-transmitting coil and the power-receiving coil,
   wherein during the inflation of the flexible cover, the flexible cover assumes a specific shape capable of removing a foreign object laid on the flexible cover before occupying the space between the power-transmitting coil and the power-receiving coil.

2. The wireless power-supplying system according to claim 1,
   wherein an internal space of the flexible cover is divided into a plurality of regions, and
   the wireless power-supplying system further comprises a gas-supplying member, wherein, when the electric power is supplied, the gas-supplying member sequentially supplies gas to the regions, starting from a part of the regions and switching at a time interval to a region adjacent to the part of the regions in a radial direction with respect to a direction perpendicular to an upper surface of the power-transmitting coil.

3. The wireless power-supplying system according to claim 2,
   wherein the flexible cover is divided into a plurality of regions concentrically with respect to the direction perpendicular to the upper surface of the power-transmitting coil, and
   the gas-supplying member sequentially supplies the gas to the regions, starting from a central circular region of the flexible cover and switching to a region adjacent to the central circular region at a time interval.

4. The wireless power-supplying system according to claim 2,
   wherein the flexible cover is divided into a conical region covering the power-transmitting coil and a region around the conical region, and
   the gas-supplying member first supplies the gas to the conical region and supplies the gas to the region around the conical region after the conical region is inflated.

* * * * *